United States Patent
Niebling et al.

(10) Patent No.: US 6,857,783 B2
(45) Date of Patent: Feb. 22, 2005

(54) PROTECTIVE DEVICE FOR ANTIFRICTION BEARING WITH ROTATIONAL SPEED MEASUREMENT

(75) Inventors: Peter Niebling, Bad Kissingen (DE); Jens Heim, Schweinfurt (DE); Roland Langer, Schwanfeld (DE); Heinrich Hofmann, Schweinfurt (DE)

(73) Assignee: FAG Kugelfischer AG & Co. KG (DE)

( * ) Notice: Subject to any disclaimer, the term of this patent is extended or adjusted under 35 U.S.C. 154(b) by 99 days.

(21) Appl. No.: 10/424,204

(22) Filed: Apr. 25, 2003

(65) Prior Publication Data

US 2003/0223665 A1 Dec. 4, 2003

(30) Foreign Application Priority Data

Apr. 27, 2002 (DE) .......................................... 102 18 937

(51) Int. Cl.[7] .............................................. F16C 19/08
(52) U.S. Cl. ........................................ 384/448; 384/446
(58) Field of Search ................................ 384/448, 446, 384/544, 537; 324/174

(56) References Cited

U.S. PATENT DOCUMENTS 5,575,568 A * 11/1996 Rigaux et al. ............... 384/448
6,232,772 B1 * 5/2001 Liatard et al. ............... 324/174

* cited by examiner

Primary Examiner—Lenard A. Footland
(74) Attorney, Agent, or Firm—Ostrolenk, Faber, Gerb & Soffen, LLP

(57) ABSTRACT

A wheel bearing having an external, rotating, magnetic encoder which registers rotational speed of the bearing, and a magnetic particle trapping device spaced from the magnetic encoder to protect it against contamination. The trapping device includes a permanent magnet and a cooperating soft iron member which together form an L-shaped configuration relative to each other, with the magnet extending axially relative to the rotation of the wheel and the soft iron member extending radially, or vice versa. Contaminants are collected in a space between the soft iron member and the magnet. A magnetically non-conductive element may be provided to separate the trapping device from the metallic housing of the constant velocity joint on which the trapping device is mounted. A wiping finger may be provided to dislodge accumulated contaminant particles, which may then fall to the roadway.

23 Claims, 4 Drawing Sheets

PROTECTIVE DEVICE FOR ANTIFRICTION BEARING WITH ROTATIONAL SPEED MEASUREMENT

RELATED APPLICATIONS

This application claims priority to German Application No. 102 18 937.4 filed Apr. 27, 2002.

BACKGROUND OF THE INVENTION

1. Field of the Invention

This invention relates to a protective device for a wheel bearing of a motor vehicle, which is equipped with a rotational speed measuring device.

2. Relevant Art

The rotational speed of automobile wheel bearings often needs to be measured, e.g., to control an ABS (anti-lock braking system). Conventionally, rotational speed measuring devices consist of a magnetic elastomer (magnetic encoder), which is embedded or integrated into the seal of the antifriction bearing. In order to be able to tap off the magnetic signal from this encoder, the latter is fitted to the outside of the antifriction bearing and connected to the rotating part of the antifriction bearing. Arranged at a short distance in front of latter is a Hall sensor, which evaluates the magnetic pulses from the rotating encoder and in this way determines the rotational speed signal. Both the magnetized encoder and the Hall sensor operate with magnetic parts. In EP 607719 B1, for example, such seals with external magnetic encoders are shown.

Experience has shown that these magnetic encoders or the associated sensors can be contaminated by ferromagnetic particles. These can be, for example, fine iron filings, which are deposited on the encoder over the course of time, or also ore-bearing soil. If too much ferromagnetic contamination is deposited on the magnetic encoder, the functioning of the encoder can be restricted to a great extent. In the event of severe contamination, this can even lead to the rotational speed signal from the wheel bearing no longer being reliably obtainable.

In JP 56 12 08 19, two permanent magnets are shown, which are intended to build up an opposing magnetic field, in order to protect an antifriction bearing against metallic particles from the electric motor. The problem with this arrangement is that the metallic particles which have become lodged between the magnets can no longer be thrown out and thus, given an excessive quantity of contaminants, get into the antifriction bearing.

SUMMARY OF THE INVENTION

There is therefore the object of the invention to provide a wheel mounting with magnetic rotational speed measuring device which can function reliably even in the presence of relatively large quantities of metallic contamination.

This object is achieved according to the invention by providing a permanent magnet arranged on a soft iron member axially in front of the magnetic encoder. The permanent magnet catches magnetic dirt particles in front of the bearing seal in a "magnetic trap" which has its magnetic field oriented in such a way that the contamination is deposited on the soft iron member axially in front of the permanent magnet. This arrangement makes it possible to collect the magnetic contamination axially in front of the permanent magnet and, at high rotational speeds of the wheel, to throw it off again. This effect acts particularly well in the case of ferromagnetic soil and moisture. The ferromagnetic soil sucks up the moisture, becomes heavier as a result and can therefore be thrown off more easily.

The magnetic particle trapping device can be arranged either on the rotating part or on the stationary part. An advantage of placement on the rotating part is that, as the vehicle speed increases, a greater self-cleaning effect occurs as a result of the centrifugal force.

According to another feature of the invention, a wiping finger which projects into the space where the magnetic particles are accumulated can be provided to move the particles, especially large quantities of particles in front of the particle trapping device where they can fall onto the roadway outside the wheel bearing unit. A preferred position of the wiping finger is at the lowest point of the magnetic particle trapping device (6 o'clock position).

In the case of a stationary magnetic particle trapping device, a rotating wiping finger can be provided.

BRIEF DESCRIPTION OF THE DRAWINGS

Like parts are given like reference numbers throughout the drawings.

DETAILED DESCRIPTION OF THE INVENTION

Figure 1:
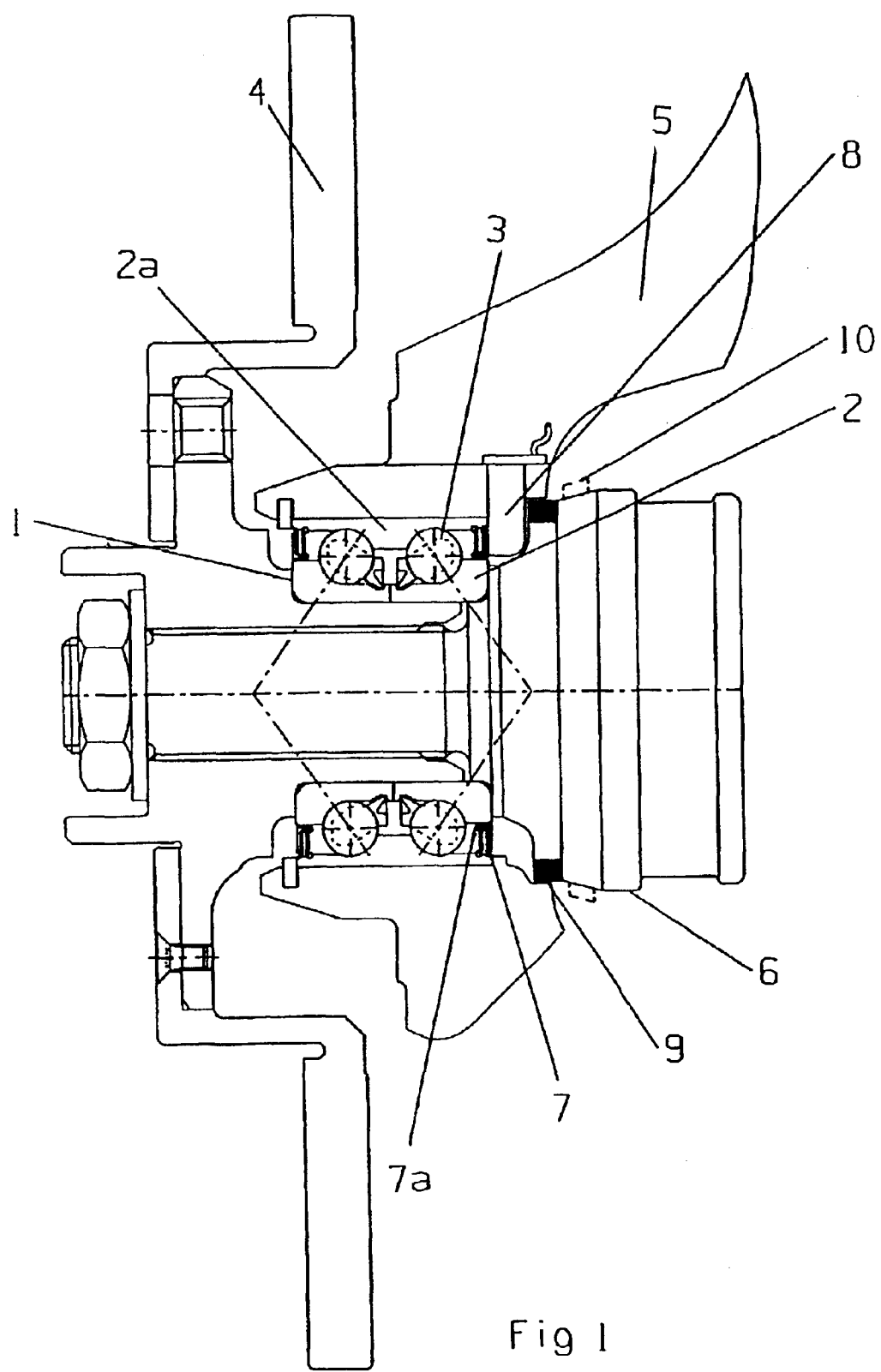
FIG. 1 shows a sectional view of a wheel bearing unit with brake disc and the constant velocity joint.

FIG. 1 shows a sectional view of a wheel bearing unit 1 comprising a brake disc 4, a constant velocity joint 6, and wheel carrier 5. A seal 7a with a magnetic encoder 7 arranged on the outside is fitted to the rotating inner ring 2 of the bearing. A stationary sensor 8 is positioned to detect magnetic signals from the magnetic encoder 7. An output of sensor 8 is used in any suitable or convenient manner to determine the rotational speed of the wheel.

A magnetic particle trapping device 9 described in detail below is located adjacent to sensor 8. Another possible position for the magnetic particle trapping device is indicated in outline at 10. These positions are exemplary; the magnetic trapping device can likewise be fitted closer to the antifriction bearing or axially further removed. The precise construction of the magnetic particle trapping device is shown in the following figures.

Figure 2:
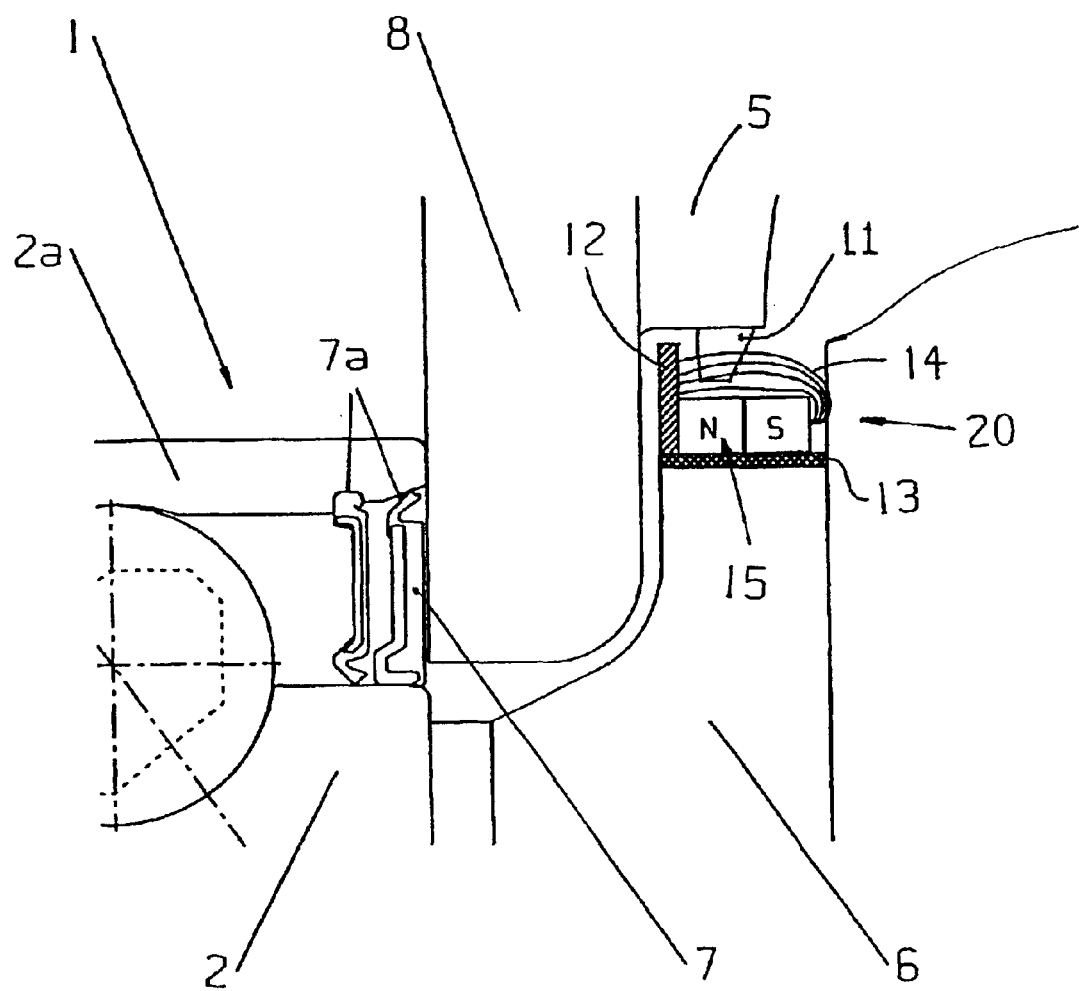
FIGS. 2, 3 and 4 are fragmentary sectional views of different embodiments of the magnetic particle trapping device according to the invention.

FIG. 2 shows the details of a magnetic particle trapping device 20 according to a first preferred embodiment. Here, a magnet 15 is provided in the form of a tubular sleeve having its magnetic north and south poles 22 and 24 arranged axially beside each other. To reduce the magnetic flux in the direction of the metallic constant velocity joint 6 and intensify it in a radially opposite particle collecting region, a magnetically nonconductive sleeve 13 is positioned between magnet 15 and constant velocity joint 6.

On the side of trapping device 20 axially closest to magnetic encoder 7 is located a magnetically conductive soft annular disk 12, which forms a gap seal with respect to the stationary wheel carrier 5, and at the same time, directs the magnetic flux 14 from north pole 22 in the direction of south pole 24, thereby defining an area in which metallic contamination can accumulate. The gap seal with respect to the wheel support is important, since penetrating liquid must be able to flow away again out of the region in front of the seal.

A stationary wiping finger 11 is optionally affixed to wheel carrier 5. This extends radially toward magnet 15 to dislodge the accumulated particles. Alternatively, wiping finger can be positioned diametrically opposite to the position shown whereby the dislodged particle can fall directly to the roadway below.

Figure 3:
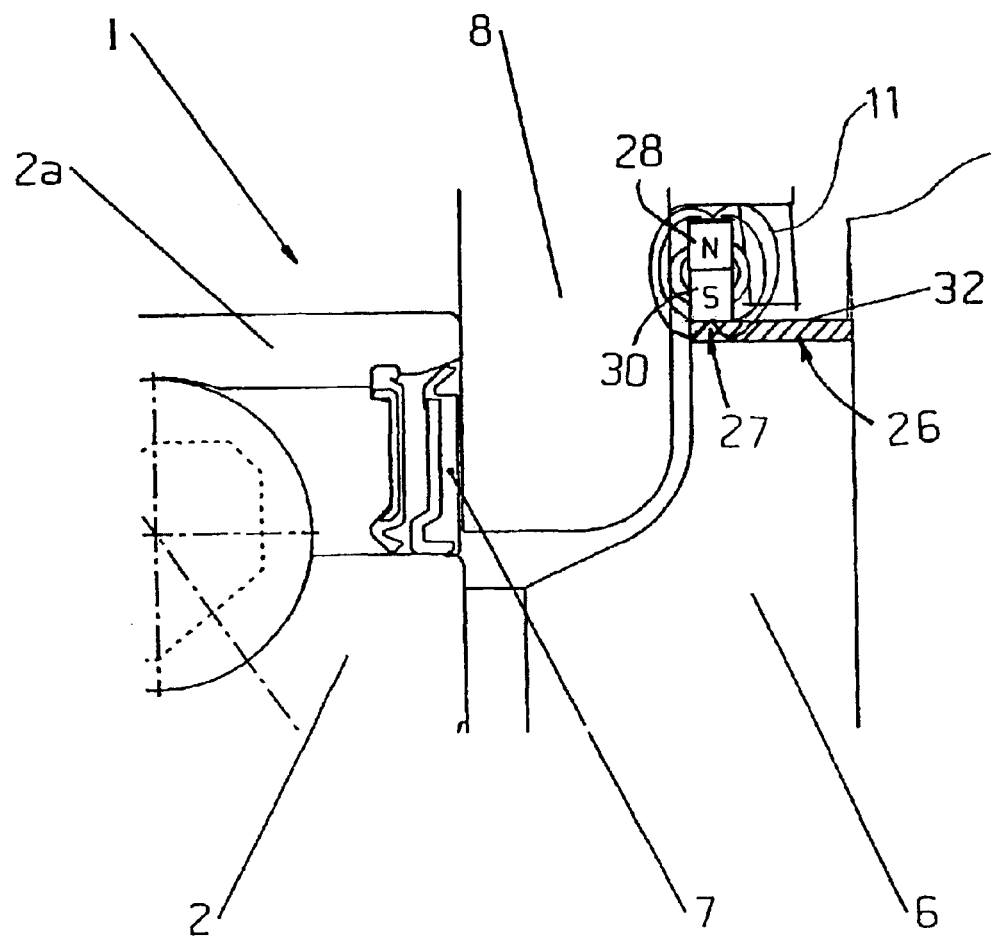

FIG. 3 shows a different construction of a magnetic particle trapping device 26. In this embodiment permanent magnet 27 is in the form of an annular disk with its north pole 28 and its south pole 30 spaced radially, rather than axially as in the embodiment of FIG. 2. A sleeve 32 formed of soft iron is positioned between magnet 27 and constant velocity joint 6, in contact with one pole of magnet 27, e.g., south pole 30. In this embodiment, the gap seal is formed by the permanent magnet 27, while the positioning of south pole 30 of the magnet against soft iron sleeve 32 specifically builds up the magnetic field 34 axially away from the seal. The contamination therefore accumulates between magnet 27 and the soft iron sleeve 32. The remainder of the construction is the same as in FIG. 2.

Figure 4:
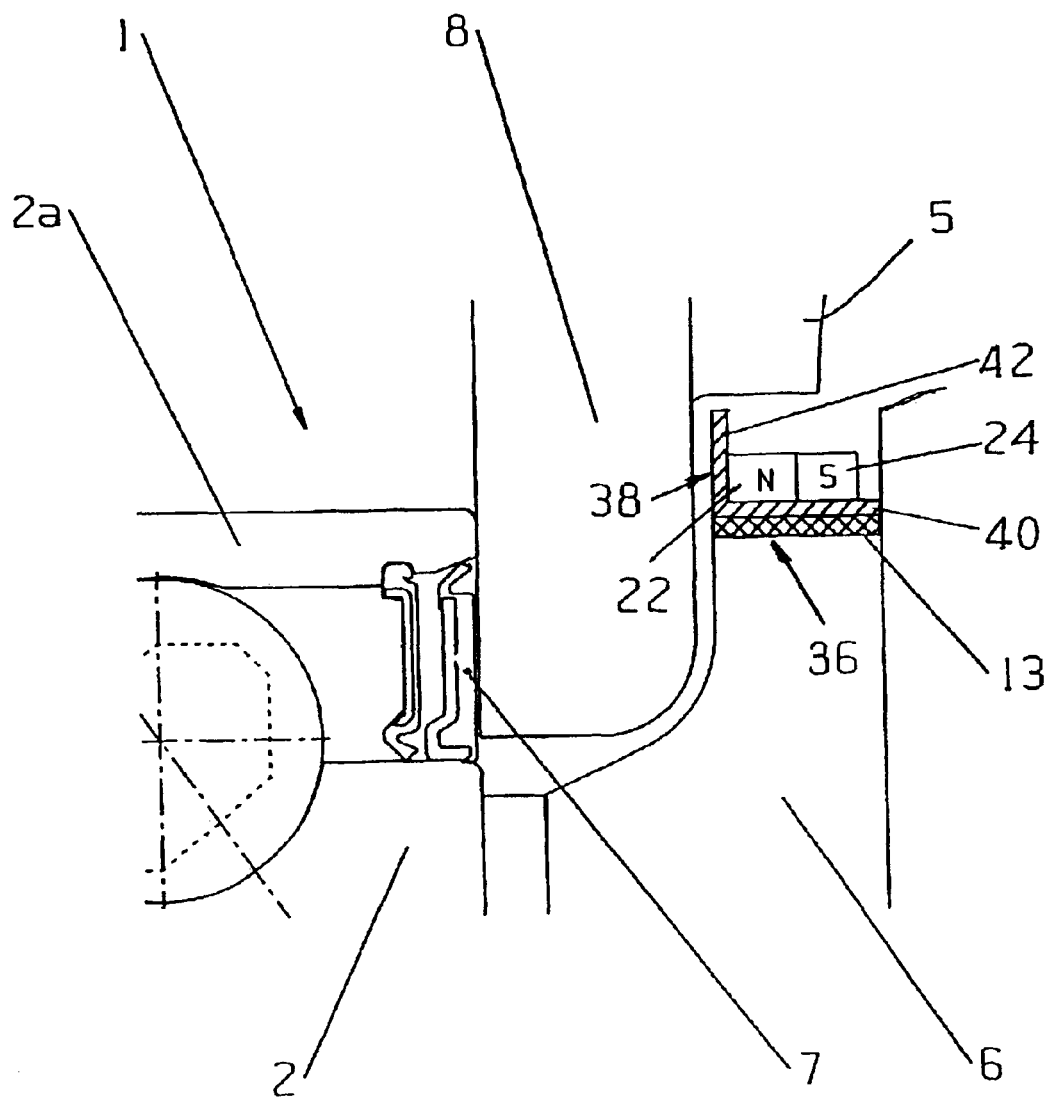

A variation of the embodiment of FIG. 2 is shown at 36 in FIG. 4. Here, a soft iron member 38 has an L-shaped cross-section, and is formed of an axially extending tubular portion 40 and a radially extending flange portion 42. Magnetically nonconductive sleeve 13 separates tubular portion 40 from constant velocity joint 6.

Magnet 15 is in the form of a tubular sleeve, with its north and south poles 22 and 24 arranged axially as in FIG. 2, and is mounted on tubular portion 40 of soft iron member 36. In this variation, flange portion 38 forms the gap seal, and the particles accumulate in the space radially beyond magnet 15, and axially beyond flange 38. A wiping finger (not shown) may again be provided either in the position illustrated in FIGS. 2 and 3, or at the diametrically opposite position.

In the embodiments of FIGS. 2–4, magnets 15 and 27, magnetically nonconductive member 13, and soft iron members 12, 32 and 38 have been shown as circumferentially continuous structures. As an alternative to such construction, the magnets, magnetically non-conductive members, and the soft iron members can be in the form of one or more discrete parts.

Thus, with respect to the embodiment of FIG. 2, in a further embodiment, magnet 15 may be in the form of a baton-like bar, and soft iron member 12 and magnetically non-conductive member 13 may respectively be in the form of plates or bars.

With respect to the embodiment of FIG. 3, in an alternative embodiment, the permanent magnet may be in the form of a radially extending bar or the like rather than a continuous annular disk, and the soft iron member may be in the form of a plate mounted on the body of constant velocity joint 6, rather than a continuous sleeve.

With respect to FIG. 4, in an alternative embodiment, the soft iron member can be in the form of an L-shaped bracket, with axially and radially extending bar-like legs, and the magnetically nonconductive sleeve member would likewise be in the form of an axial plate positioned between the axial leg of the soft iron member and constant velocity joint 6. A magnet in the form of an axial bar with north and south poles 22 and 24 arranged axially, would be mounted on the axial leg of the soft iron member.

As will be understood by those skilled in the art, as yet further alternative embodiments, several magnets, soft iron members, and magnetically non-conductive elements, each as described previously, may be provided in circumferentially spaced relationship around the periphery of constant velocity joint 6.

In each of these alternative embodiments, wiping fingers may again be provided either in the position illustrated in FIGS. 2 and 3, or at the diametrically opposite positions.

Although the present invention has been described in relation to particular embodiments thereof, many other variations and modifications and other uses will become apparent to those skilled in the art. It is intended therefore, that the present invention not be limited by the specific disclosure herein, but rather that it is to be given the full scope indicated by the appended claims.

We claim:

1. A wheel bearing comprised of:

an external rotating magnetic encoder constructed to respond to rotational speed of the bearing;

a sensor positioned to cooperate with the encoder to provide an output signal representative of the rotational speed of the bearing; and a magnetic particle trapping device positioned in adjacent spaced relationship to the encoder and the sensor which protects the magnetic encoder against contamination.

2. The wheel bearing as claimed in claim 1, wherein the magnetic particle trapping device is positioned between a wheel carrier and a constant velocity joint.

3. The wheel bearing as claimed in claim 1, wherein the magnetic particle trapping device includes a permanent magnet and a cooperating soft iron member.

4. The wheel bearing as claimed in claim 3, wherein the soft iron member and the permanent magnet are in an L-shaped configuration relative to each other, and contaminants are collected in a space between the soft iron member and the magnet.

5. Wheel bearing according to claim 4, further including a wiping finger which projects into the space in which the contaminants are collected.

6. The wheel bearing as claimed in claim 3, wherein:

the soft iron member comprises an element which extends radially relative to the axis of rotation of the bearing; and the permanent magnet comprises an element mounted on a constant velocity joint, and which extends axially relative to the bearing, one end of the magnet being in contact with a surface of the soft iron member.

7. The wheel bearing as claimed in claim 6, wherein the soft iron member is in the form of an annular disk and the magnet is in the form of a tube.

8. The wheel bearing as claimed in claim 6, wherein the soft iron member is in the form of one or more radially extending bars, and the magnet is in the form of one or more axially extending bars.

9. The wheel bearing as claimed in claim 6, further including a magnetically nonconductive member positioned between the permanent magnet and the constant velocity joint.

10. The wheel bearing as claimed in claim 9, wherein the magnetically nonconductive member is in the form of an axially extending sleeve.

11. The wheel bearing as claimed in claim 9, wherein the magnetically nonconductive member is in the form of an axially extending bar.

12. The wheel bearing as claimed in claim 6, wherein:

the soft iron member further comprises a portion which extends axially relative to the bearing between the permanent magnet and a constant velocity joint.

13. The wheel bearing as claimed in claim 12, further including a magnetically nonconductive element positioned between the axially extending portion of the soft iron member and the constant velocity joint.

14. The wheel bearing according to claim 13, wherein the permanent magnet, the soft iron member, and the magnetically nonconductive member are each continuous circumferential structures.

15. The wheel bearing according to claim 13, wherein the permanent magnet, the soft iron member, and the magnetically nonconductive member are formed of discrete flat bars.

16. The wheel bearing as claimed in claim 3, wherein:
the permanent magnet comprises an annular disk portion which extends radially relative to the axis of rotation of the bearing; and
the soft iron member comprises a tubular portion which extends axially relative to the bearing, and with one pole of the magnet in contact therewith.

17. The wheel bearing according to claim 16, wherein the permanent magnet, the soft iron member, and the magnetically nonconductive member are each continuous circumferential structures.

18. The wheel bearing according to claim 16, wherein the permanent magnet, the soft iron member, and the magnetically nonconductive member are in the form of one or more discrete structures.

19. The wheel bearing as claimed in claim 3, wherein the soft iron member extends radially relative to the axis of rotation of the bearing, and forms a gap seal with respect to a wheel carrier.

20. The wheel bearing as claimed in claim 3, wherein the permanent magnet extends radially relative to the axis of rotation of the bearing, and forms a gap seal with respect to a wheel carrier.

21. The wheel bearing according to claim 1, further including a wiping finger which projects into the magnetic particle trapping device.

22. The wheel bearing according to claim 1, wherein the magnetic particle trapping device is mounted on a rotating portion of the bearing.

23. The wheel bearing according to claim 1, wherein the magnetic particle trapping device is mounted on a stationary portion of the bearing.

* * * * *